No. 893,218. PATENTED JULY 14, 1908.
E. P. ZAHNTER.
WEDGE MAKING MACHINE.
APPLICATION FILED SEPT. 5, 1907.

Witnesses.
F. C. Dahlberg
A. G. Hague

Inventor.
E. P. Zahnter.
by Owig & Law Atty's

UNITED STATES PATENT OFFICE.

ERVIE PLINTEN ZAHNTER, OF HIGHLAND, CALIFORNIA, ASSIGNOR OF ONE-HALF TO
C. M. HILL, OF HIGHLAND, CALIFORNIA.

WEDGE-MAKING MACHINE.

No. 893,218.   Specification of Letters Patent.   Patented July 14, 1908.

Application filed September 5, 1907. Serial No. 391,526.

*To all whom it may concern:*

Be it known that I, ERVIE PLINTEN ZAHNTER, a citizen of the United States, residing at Highland, in the county of San Bernardino, in the State of California, have invented a certain new and useful Wedge-Making Machine, of which the following is a specification.

The object of my invention is to provide a machine of simple, durable and inexpensive construction, especially designed for quickly and accurately cutting wooden wedges of the kind used by vehicle wheel makers, in wedging the spoke tenons in the felly.

A further object is to provide a device of this kind which may be quickly and easily adjusted, for making wedges of various degrees of incline, and for cutting other articles on any desired taper.

My invention consists in the construction, arrangement and combination of the various parts of the device, whereby the objects contemplated are attained, as hereinafter more fully set forth, pointed out in my claims and illustrated in the accompanying drawings, in which—

Figure 1:
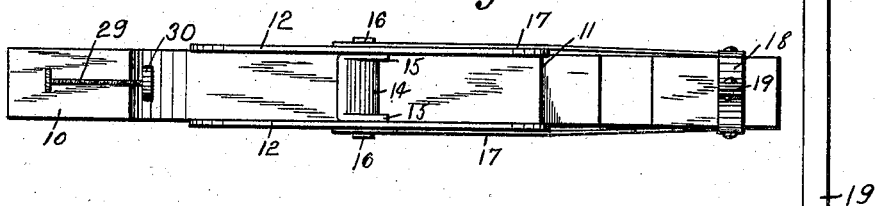
Figure 2:
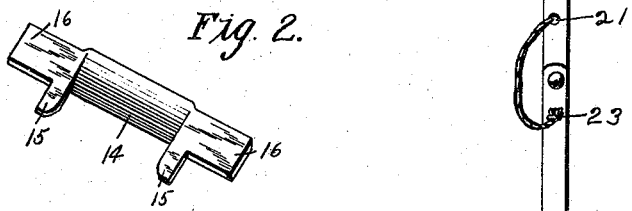
Figure 3:
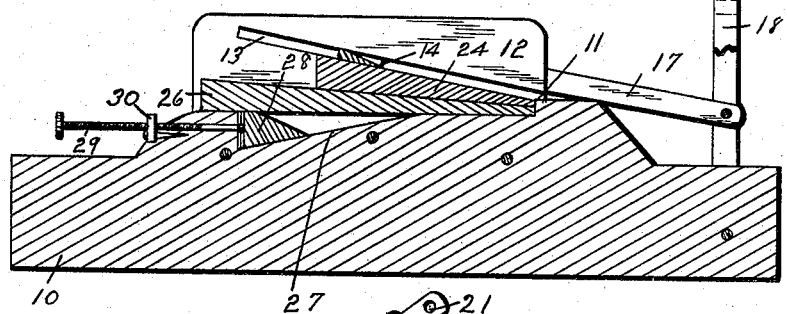
Figure 4:
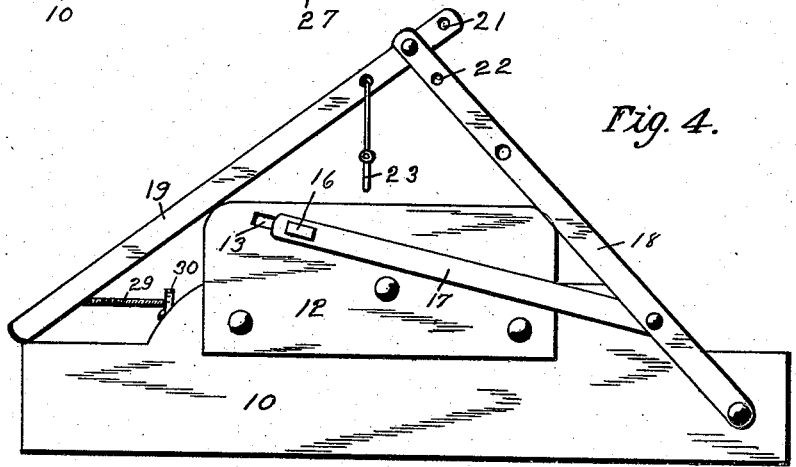

Figure 1 shows a top or plan view of the complete wedge making machine embodying my invention. Fig. 2 shows a detail, perspective view of the knife. Fig. 3 shows a vertical, central sectional view of the complete machine embodying my invention, and Fig. 4 shows a side elevation of same, with the operating handle in a folded position.

Referring to the accompanying drawings, I have used the reference numeral 10 to indicate the base of the machine. This is preferably made complete of a solid block of hard wood, and is provided with a shoulder 11 at one end of its top surface. Bolted to the sides of the block 10 are the guide plates 12, having inclined slots 13 formed in their sides above the base. The lower ends of the slots terminate at a point adjacent to the shoulder 11.

The wedge cutting knife comprises a blade portion 14, two forwardly projecting guide lugs 15, and two outwardly projecting ends 16, which latter extend through the slots 13. Fixed to the ends 16 are the links 17, arranged outside of the plates 12. Fulcrumed to one end of the block 10 is the forked operating lever 18, having the links 17 pivoted thereto, on the inner sides of the forked arms of said lever. At the upper end of the lever 18 is an extension handle 19, pivotally connected with the handle member 18. The lower end of the handle 19 is provided with an opening 21, and the handle member 18 is provided with an opening 22, which will register with the opening 21, when the handle member is in line with the lever. A pin 23 is provided to be passed through said openings 21 and 22, to thereby lock the handle member in line with the member 18, thus forming a long handle to give a powerful leverage to the knife, and also providing means whereby the handle and lever may be folded into compact form, as shown in Fig. 4. In Fig. 3 of the drawings, I have shown a wedge, indicated by the numeral 24, of the kind made by the machine.

In order to provide for making wedges of various angles I have placed a tapered block 26 on top of the base 10, upon which the wedges to be cut are placed, one end of this block 26 resting against the shoulder 11. Beneath the block 26 is a recess having an inclined bottom 27 and mounted in this recess is a wedge shaped block 28, its lower portion resting on the inclined bottom 27, and its top resting against the wedged shaped block 26. Connected with the block 28 is a screw 29 which is passed through a screw threaded plate 30 secured to the base 10. If it is desired to elevate the end of block 26 furthest from the shoulder 27, I turn the screw 29 in such a manner as to force the block 28 toward the shoulder 11, in this way the device is adapted for making wedges of a less degree of taper than would be made with the block 26 in its position shown in Fig. 3. In this connection it is to be understood that the device illustrated and described is equally well adapted for use in cutting other material, such for instance as leather straps, on an incline for the purpose of sewing two straps together.

In practical use, and assuming the device to be in the position shown in Fig. 3, the operator places the wood to be formed into a wedge, between the side plates 12, with one end resting against the shoulder 11. He then grasps the handle 19, and forces the knife through the wood, until the knife reaches the end of its movement in the slots 13, and until the cutting edge of the blade stands adjacent to the shoulder 11, of the base. During this stroke, the wood will be smoothly and accurately cut along the line in which the slotted guides direct the cutting blade. The operation of forming these wedges may be accomplished very rapidly, as it is only necessary to place the wood in position, and then operate the lever, and all of the wedges will be of uniform size, and smoothly and accurately cut. When the machine is not in use, the extension handle 19 may be folded, as shown in Fig. 4, so that a minimum of space will be occupied by it.

If it is desired to adjust the machine for cutting wedges on a different incline this may be readily and quickly done by the manipulation of the screw 29.

Having thus described my invention, what I claim and desire to secure by Letters Patent of the United States, therefor, is—

1. In a wedge making machine, the combination of a base, guides permanently fixed to the base and extended above it, a knife slidingly mounted in said guides, a lever fulcrumed to the base, links connecting the lever with the knife, a tapered block mounted upon the base, a wedge mounted on the base beneath the tapered block, and a screw extended horizontally through the base and projecting above one end of the base, said screw being connected to said wedge, whereby the wedge may be adjusted and the tapered block raised or lowered by manipulation of the screw above the base.

2. In a wedge making machine, the combination of a base having a shoulder at its top near one end, two plates fixed to the sides of the base and projecting above it, and provided with inclined parallel slots, terminating at a point adjacent to said shoulder, a knife slidingly mounted in said slots, and having guide lugs in front of its cutting edge and extension ends, links attached to said extension ends, a forked lever fulcrumed to the base and having said links pivoted to the inner sides of the forked members, an extension handle on said lever, capable of folding over the base, and means for locking the extension handle in line with the lever.

3. In a wedge making machine, the combination of a base, guide plates fixed to the base and formed with slots, a knife having a cutting blade at its central portion and having guides projected in front of the cutting blade, said guides being arranged inside of the guide plates, extension ends on the knife projected out through the slots in the guide plate, links connected to the extension ends, and a lever connected to said links and fulcrumed to the base.

Des Moines, Iowa, 3, 28, '07.

ERVIE PLINTEN ZAHNTER.

Witnesses:
 L. S. STEELE,
 E. M. BRICE.